(12) United States Patent
Kuno et al.

(10) Patent No.: US 11,644,882 B2
(45) Date of Patent: May 9, 2023

(54) SYSTEM AND METHOD FOR PREDICTING POWER USAGE OF NETWORK COMPONENTS

(71) Applicant: Hewlett Packard Enterprise Development LP, Houston, TX (US)

(72) Inventors: Harumi Kuno, Cupertino, CA (US); Alan Davis, Coalville, UT (US); Torsten Wilde, Berlin (DE); Daniel William Dauwe, Ft. Collins, CO (US); Duncan Roweth, Bristol (GB); Ryan Dean Menhusen, Ft. Collins, CO (US); Sergey Serebryakov, Saint Petersburg (RU); John L. Byrne, Pasadena, CA (US); Vipin Kumar Kukkala, Ft. Collins, CO (US); Sai Rahul Chalamalasetti, Newark, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 170 days.

(21) Appl. No.: 17/337,107

(22) Filed: Jun. 2, 2021

(65) Prior Publication Data
US 2022/0390999 A1  Dec. 8, 2022

(51) Int. Cl.
*G06F 1/3206* (2019.01)
*G06F 1/30* (2006.01)
(Continued)

(52) U.S. Cl.
CPC .............. *G06F 1/305* (2013.01); *G06F 1/188* (2013.01); *G06F 1/3206* (2013.01); *H02J 3/003* (2020.01)

(58) Field of Classification Search
CPC ........ G06F 1/305; G06F 1/188; G06F 1/3206; H02J 3/003
See application file for complete search history.

(56) References Cited

U.S. PATENT DOCUMENTS 10,796,035 B1\* 10/2020 Xia .......................... G06F 30/18
2004/0006724 A1\* 1/2004 Lakshmanamurthy ...................... G06F 11/348
714/25

(Continued)

OTHER PUBLICATIONS

Ahmad et al., "Predicting Completion Times of Batch Query Workloads using Interaction-aware Models and Simulation", ACM, 2011, 12 pages.

(Continued)

*Primary Examiner* — Gary Collins
(74) *Attorney, Agent, or Firm* — Park, Vaughan, Fleming & Dowler LLP (57) ABSTRACT

One embodiment provides a system and method for predicting network power usage associated with workloads. During operation, the system configures a simulator to simulate operations of a plurality of network components, which comprises embedding one or more event counters in each simulated network component. A respective event counter is configured to count a number of network-power-related events. The system collects, based on values of the event counters, network-power-related performance data associated with one or more sample workloads applied to the simulator; and trains a machine-learning model with the collected network-power-related performance data and characteristics of the sample workloads as training data 1, thereby facilitating prediction of network-power-related performance associated with a to-be-evaluated workload.

20 Claims, 6 Drawing Sheets

(51) Int. Cl.
*H02J 3/00* (2006.01)
*G06F 1/18* (2006.01)

(56) References Cited

U.S. PATENT DOCUMENTS

| | | | | |
|---|---|---|---|---|
| 2008/0262822 | A1* | 10/2008 | Hardwick | G06F 11/3457 |
| | | | | 703/21 |
| 2016/0162611 | A1* | 6/2016 | Mardikar | G06Q 10/10 |
| | | | | 703/22 |
| 2017/0286252 | A1* | 10/2017 | Illikkal | H04L 47/76 |
| 2019/0149425 | A1* | 5/2019 | Larish | H04L 43/08 |
| | | | | 706/16 |
| 2019/0286971 | A1* | 9/2019 | Che | G06N 3/0481 |
| 2022/0232470 | A1* | 7/2022 | Valcarce Rial | H04W 24/02 |

OTHER PUBLICATIONS

Deepmind, DeepMind AI Reduces Google Data Centre Cooling Bill by 40%, available online at <https://deepmind.com/blog/article/deepmind-ai-reduces-google-data-centre-cooling-bill-40>, Jul. 20, 2016, 6 pages.

Fan et al., "Power Provisioning for a Warehouse-sized Computer", In Proceedings of the ACM International Symposium on Computer Architecture, Jun. 2007, 11 pages.

Gao, Jim, "Machine Learning Applications for Data Center Optimization", available online at <https://static.googleusercontent.com/media/research.google.com/ru//pubs/archive/42542.pdf>, 2014, 13 pages.

Nrel, "High-Performance Computing Data Center Power Usage Effectiveness", available online at <https://web.archive.org/web/20210519193215/https://www.nrel.gov/computational-science/measuring-efficiency-pue.html>, May 19, 2021, 2 pages.

Shoukourian et al., "Using Machine Learning for Data Center Cooling Infrastructure Efficiency Prediction", IEEE International Parallel and Distributed Processing Symposium Workshops, 2017, pp. 954-963.

Shoukourian et al., "Predicting the Energy and Power Consumption of Strong and Weak Scaling HPC Applications", Supercomputing Frontiers and Innovations, 2014, 22 pages.

* cited by examiner

SYSTEM AND METHOD FOR PREDICTING POWER USAGE OF NETWORK COMPONENTS

BACKGROUND

Field

This disclosure is generally related to managing power usage in a computer system. More specifically, this disclosure is related to a system and method for predicting power usage of network components in the computer system.

Related Art

Many of today's new and critical business applications (e.g., widespread adoption of artificial intelligence (AI), mining of Big Data, more sophisticated and more granular modeling and simulation, etc.) are pushing the limits of traditional datacenters. In response, high performance computing (HPC) datacenters are being developed. Compared with traditional datacenters, HPC datacenters have higher electricity consumption due to their more powerful processors, a higher density of servers, and more important cooling needs. Understanding the power consumption cycle of an HPC datacenter can be very important in both the designing and the operating of the datacenter.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

The disclosed embodiments provide solutions to the technical problem of predicting a priori the amount of power usage of network components (e.g., routers, switches, interfaces, etc.) within a large computer system (e.g., a datacenter). More specifically, the network power consumption of the computer system can be predicted by combining running simulations and applying a machine-learning technique. During operation, the system can collect training data by running a variety of application workloads either on a simulator that simulates operations of datacenters or on actual hardware (e.g., real processors and storage devices). The training data can include the statistics of events that drive power usage on network components (e.g., number and type of operations executed and memory usages) and the applications' performance characteristics. The system can then use such training data to train a machine-learning model to predict network power-usage event statistics of a given workload. Once such a model is trained for a datacenter configuration, and given a workload to be executed, the system can input the characteristics of the workload to the machine-learning model, which can then predict the power-usage event statistics of the network components. Such predicted statistics can then be used to determine the network power usage.

With the increased size and computation power of datacenters (which can include thousands of computing nodes, their associated storage hierarchy, and interconnection infrastructure), power and energy concerns become increasingly important. After the deployment of a datacenter, it is cost-effective to maximize the usage of the available power budget of the datacenter. However, the complete utilization of the power budget may pose a business risk of exceeding its maximum capacity, which could result in outages or costly violations of service agreements. Being able to predict the power usage of a datacenter can be critical, even before the datacenter is built.

In a datacenter, the electrical capacity is divided among various loads, including infrastructure (air conditioning, lighting, security system, etc.), coiling system, battery charging, storage, server load, network equipment, etc. Certain loads (e.g., air conditioning, lighting, etc.) are often considered as relatively static, whereas power used by computing equipment (also referred to as critical power) is often time varying, depending on the workloads running on the datacenter. The power-usage patterns of the servers in the datacenter have been well-studied and modeled. However, there is a lack of understanding of the network power usage, i.e., the power usage of the network components (e.g., switches, routers, interface cards, etc.). Although the amount of power used by the network components can be a fraction of the amount of power used by other types of load (e.g., storage or server load), considering that an HPC datacenter can use tens of megawatts, one cannot neglect the power usage of the network components.

Implementation of smart network components (e.g., a SmartNIC) enables computation to be offloaded to the smart network components, and the offloaded computation can significantly increase the network power consumption (i.e., the amount of power consumed by the network components) of the datacenter. As a result, the network power consumption can no longer be considered as a fixed amount but will fluctuate based on the communication and computation behavior of the workload. The ability to accurately predict workloads' network power usage can be important in both the planning stage of the datacenter as well as the operating stage of the datacenter. On one hand, characterizing workloads' network power usage behavior during the design stage of a datacenter can allow the designer to take into consideration such behavior, in addition to other power considerations (e.g., considerations of computation power), while selecting hardware (e.g., switches, routers, interfaces, etc.) to construct the datacenter, as well as provisioning power for the datacenter. On the other hand, predicting a workload's network power usage when the workload is executed can allow the power-management system of the datacenter to dynamically allocate power based on the workload (e.g., additional power can be allocated to network components when network power usage is predicted to be high, or power can be allocated to other components in the datacenter when network power usage is predicted to be low, or workloads can be scheduled to run based on power availability), thus improving the overall power efficiency of the datacenter.

The task of predicting network power usage in a datacenter may seem to be straightforward. Given an existing datacenter that has been instrumented to collect power measurements from network components, application workloads can be run on the datacenter and power measurements can be collected at the same time. Together with characterizations of the application workloads, these measurements can form a training data set that can train, using known machine-learning techniques, a machine-learning model that can predict a priori network power usage for running a new workload on that existing data center.

However, there may not be an existing datacenter, as extremely large datacenters (e.g., HPC datacenters) are often one-of-a-kind. The design of each datacenter can be unique, meaning that information gathered from one datacenter may not be applicable in another datacenter. In addition, even when there is a datacenter, the hardware (e.g., switches) might not support appropriate performance counters for measuring network computation or power performance. Finally, even when there is an existing data center, and the hardware does support appropriate performance counters, running workloads to collect training data may take a prohibitively long time (e.g., multiple weeks or longer), during which other workloads could not be run on the existing data center. Moreover, if something changes that could impact the power consumption of running an application workload (e.g., new algorithm being implemented or changes to hardware or firmware), training data could need to be collected again. The disclosed embodiments provide a solution to the problem of obtaining appropriate training data for the machine-learning model that predicts network power usages of running application workloads in the absence of a pre-existing datacenter that has been instrumented to collect power measurements from network components.

Figure 1:
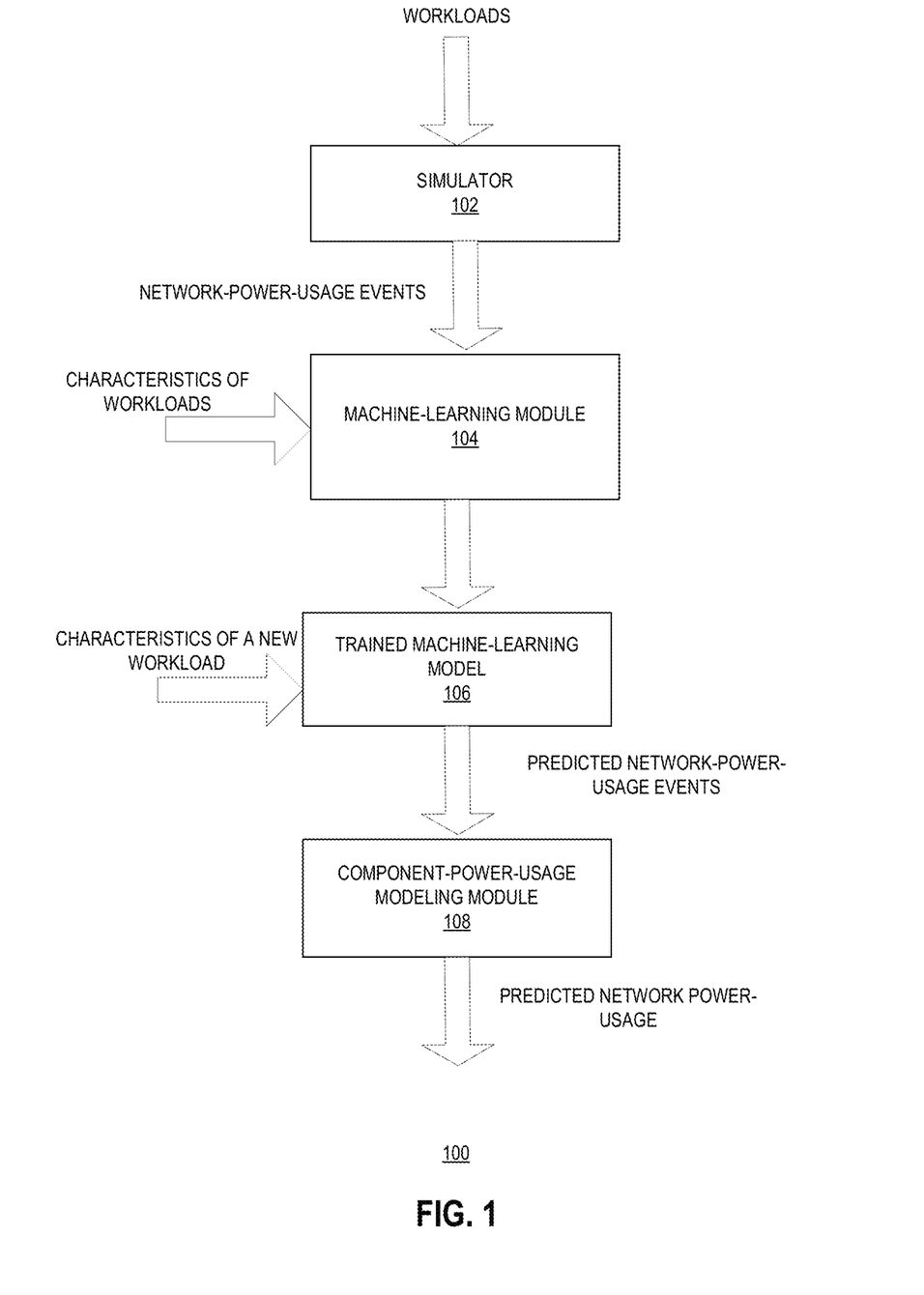
FIG. 1 illustrates an exemplary block diagram of a network-power-prediction system, according to one embodiment.

In some embodiments, when the physical datacenter is non-existent, training data of the network-power-prediction machine-learning model can be collected using a simulator that simulates operations of computer systems. FIG. 1 illustrates an exemplary block diagram of a network-power-prediction system, according to one embodiment. Network-power-prediction system 100 can include a simulator 102 that simulates operations of a computer system with interconnected nodes (e.g., an HPC system or a datacenter) and a machine-learning module 104.

Simulator 102 can be an exascale simulator that has been instrumented to perform measurements on operations occurring on network components. Note that most currently available simulators (e.g., Structural Simulation Toolkit (SST) or the event-driven interconnection network simulator SuperSIM) lack the ability to monitor the computations performed by network components. In one embodiment, an existing exascale simulator (e.g., SST or SST plus Super-SIM) can be extended by embedding counters in the simulated computer system to collect statistics about the computation performed by network components. For example, for a particular workload, the embedded counters can count the number of power-driven events occurring on the network components. More specifically, the counters are configured to collect statistics specific to the particular functions performed by each network component. For example, when a packet is being routed based on its header, the number of hardware tag-matching operations being performed can be counted. Similarly, the number of route computations (i.e., route-finding) can be counted when a switch determines the best route for a packet. Other power-driven events can also be counted by the embedded counters.

Optionally, the simulator can be extended to collect statistics about applications' performance characteristics. Such statistics can include counts and types of operations executed, amounts of data transferred, communication between types of operations, as well as characterizations of combinations of operations (e.g., halo exchange, distributed sort, matrix multiplication, etc.). Note that, although an application may be characterized by analyzing the code without running the application (either on the simulator or on a real system), running the application, even for a short period (e.g., minutes or hours instead of days or weeks), can provide a more accurate description of the characteristics of the application, including but not limited to: the communication patterns, and the sizes of data transfers.

A variety of workloads can be fed to the simulator. Note that the term "workload" can refer to one or more programs or applications running on a computer or the amount of work that software (i.e., an application) imposes on the underlying computing resources. In some embodiments, the workloads fed into the simulator can include a data-processing workload (e.g., in a programming environment like Apache Spark), a database workload, as well as a computation-heavy workload (e.g., HPC workload). Exemplary HPC workloads can include traditional HPC workloads such as genomics, graph analytics, computational chemistry, oil and gas simulation, nuclear simulation, financial risk modeling, computer-aided engineering, weather prediction, and seismic imaging, as well as emerging AI applications, like autonomous driving or robotics (reinforcement learning). The simulator can simulate distributed applications via supporting various HPC programming libraries and AI programming libraries. Examples of HPC programming libraries can include, but are not limited to: Message Passing Interface (MPI) and/or Symmetric Hierarchical MEMory (SHMEM); and examples of AI programming libraries can include, but are not limited to: Horovod, and/or vendor-specific libraries, such as NVIDIA collective communication library (NCCL), ROCm collective communication library (RCCL), and one API collective communication library (oneCCL).

While running the workloads on simulator 102 (which can be obtained by extending an existing simulator for HPC systems), statistics about the amount of works performed by the network components (e.g., switches, routers, interface cards, etc.) can be collected. The statistics can include the values of the various embedded counters, which count the number of network-power-driven events of various types. The counters can indicate the level of the computation or the duration of the computation performed by a network component. For example, a counter can count the number of hardware tag-matching operations, and a different counter can count the number of route computations performed by a SmartNIC. In addition, some counter values can also reflect the amount of memory utilized by the network component while executing a task or some measure of the amount of data processed.

In addition, while running the workloads on simulator 102, additional statistics associated with the workloads can also be collected to allow the system to determine the characteristics of the workloads more accurately. The statistics can include counts and types of operations executed, amounts of data transferred, communication between types of operations, characterizations of combinations of operations, etc.

Other than running the workloads on a simulator to collect statistics (also referred to as historical data) associated with network-power-driven events, it is also possible to run the workloads on actual hardware (if available) and obtain actual measurements on the hardware (e.g., by sensors embedded in the hardware or by instrumenting the workloads). Collecting the statistics (also referred to as historical data) associated with network-power-driven events through running simulations can provide the advantage of being able to collect statistics of rare (corner) but still important cases (e.g., a specific workload or regime of operation that needs to be optimized). Such historical data can be impossible or prohibitively expensive to obtain from existing datacenters.

Machine-learning module 104 can use characteristics of each workload and the corresponding statistics regarding the network-power-usage events (e.g., the number of hardware tag-matching operations and the number of route computations) of the workload as training samples to train a machine-learning model using various machine-learning techniques, including but not limited to: a Kernel Canonical Correlation Analysis (KCCA) model, a deep neural network, etc. After training, using a sufficient number of samples, a trained machine-learning model 106 can be obtained and can then be used to predict the performance (e.g., numbers and types of network-power-usage events) of a new workload based on the new workload's characteristics.

When hardware implementation of the simulated computer system is available, one can use the performance measurements obtained from the hardware to refine the machine-learning model. More specifically, the workloads can be run on both the simulator and the actual hardware. Some workloads can run on the simulator, some workloads can run on the actual hardware, and some can run on both. The statistics of the network-power-usage events can be collected from the simulation runs, and measurement results can be obtained from the actual hardware during the execution of the workloads. Characteristics of the workloads, statistics obtained from the simulation runs, and the measurement results from the actual hardware can be used as training data to train the machine-learning model. The statistics from the simulation runs and the predicted statistics can then be correlated to the actual measurements. This correlation relationship can then be used to predict the actual network-power-usage events associated with a new workload.

Network-power-prediction system 100 can also include a component-power-usage modeling module 108, which includes empirical or analytical models that model the power usage of the network components. In some embodiments, network-power-prediction system 100 can include a component-power-usage model for each type of component. For example, a power-usage model can be derived empirically or analytically for a particular type of SmartNIC to model the power usage of a SmartNIC, taking into account the level and/or duration of computation performed by the SmartNIC. In one particular example, the model can be used to compute the amount of power consumed by the SmartNIC for performing a number of hardware tag-matching operations. A different model can be derived for a particular type of switch and can be used to compute the amount of power consumed by a switch for performing a number of route computations. Note that here the computed power can include the increased power needed for the network component to perform the computation.

Figure 2:
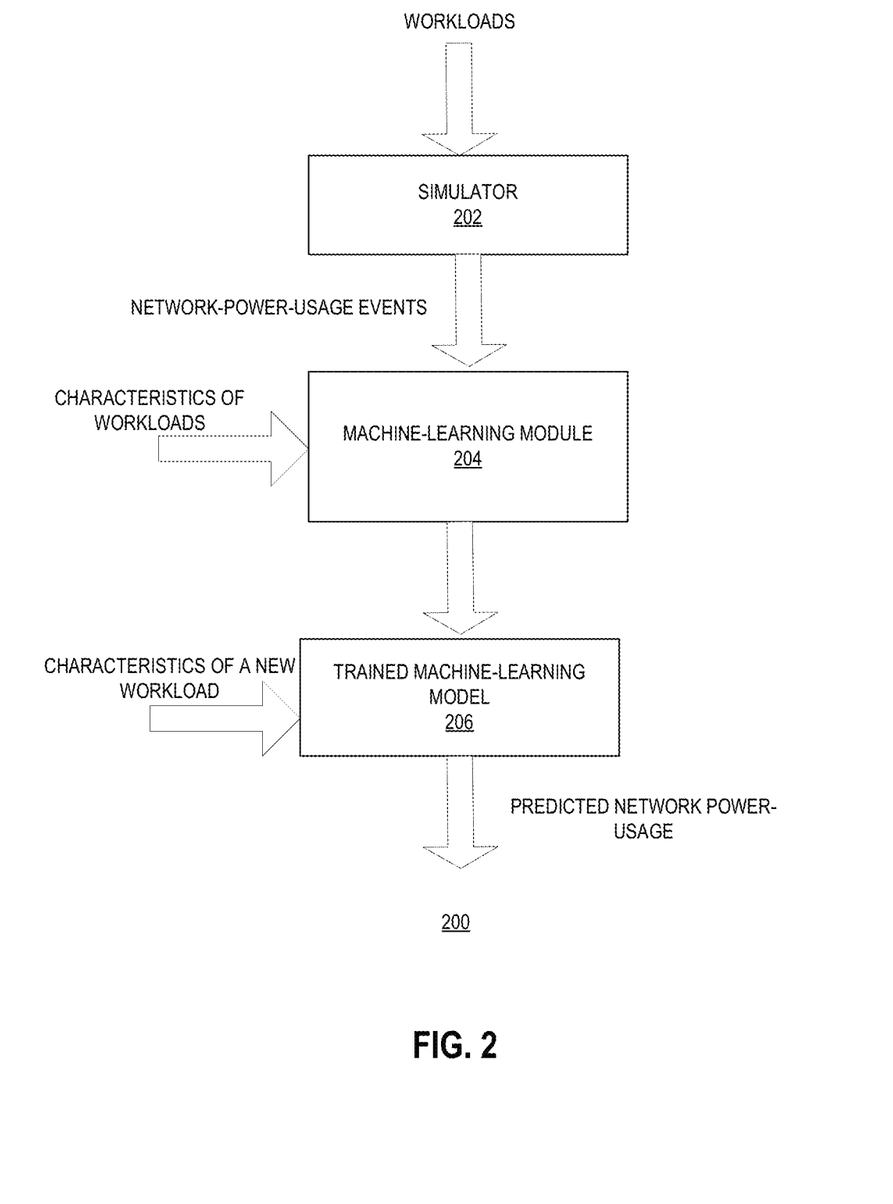
FIG. 2 illustrates an exemplary block diagram of a network-power-prediction system, according to one embodiment.

In alternative embodiments, the machine-learning model and the component-power-usage model can be combined into a single model that can be used to predict the power usage of network components based on application workload characteristics. FIG. 2 illustrates an exemplary block diagram of a network-power-prediction system, according to one embodiment. Network-power-prediction system 200 can include a simulator 202 and a machine-learning module 204.

Simulator 202 can be similar to simulator 102 and can be used to simulate the operations of a large-scale computer cluster (e.g., an HPC datacenter). Like simulator 102, simulator 202 can be configured to include a number of counters that can be used to monitor the simulated network power performance (e.g., counts the number/type of power-driven events) of the network components in the large-scale computer cluster. Note that the model of each network component in simulator 202 can be separately derived. In some embodiments, the component model can be provided by the vendor providing the components.

The output of the simulator (i.e., the network-power-usage events of a number of workloads running on the large-scale computer cluster) and the characteristics of the workloads can be used by machine-learning module 204 as training samples to train a machine-learning model that can predict network power usage of workloads. More specifically, machine-learning module 204 can incorporate the modeling of the power usage of network components such that a trained machine-learning model 206 can predict the network power usage of a new workload based on characteristics of the new workload.

In an alternative embodiment, simulator 202 can incorporate the modeling of the power usage of network components such that the outputs of simulator 202 can include the simulated amounts of network power usage of the variety of workloads running on simulator 202. The simulated amounts of network power usage of the variety of workloads can then be used to train the machine-learning model that can predict network-power usage of workloads based on their characteristics. In situations where actual hardware is available, the workloads can run on the actual hardware and the actual power usage of the network components can be determined based on sensors embedded in the hardware. The measured power usage can be part of the training data.

Figure 3:
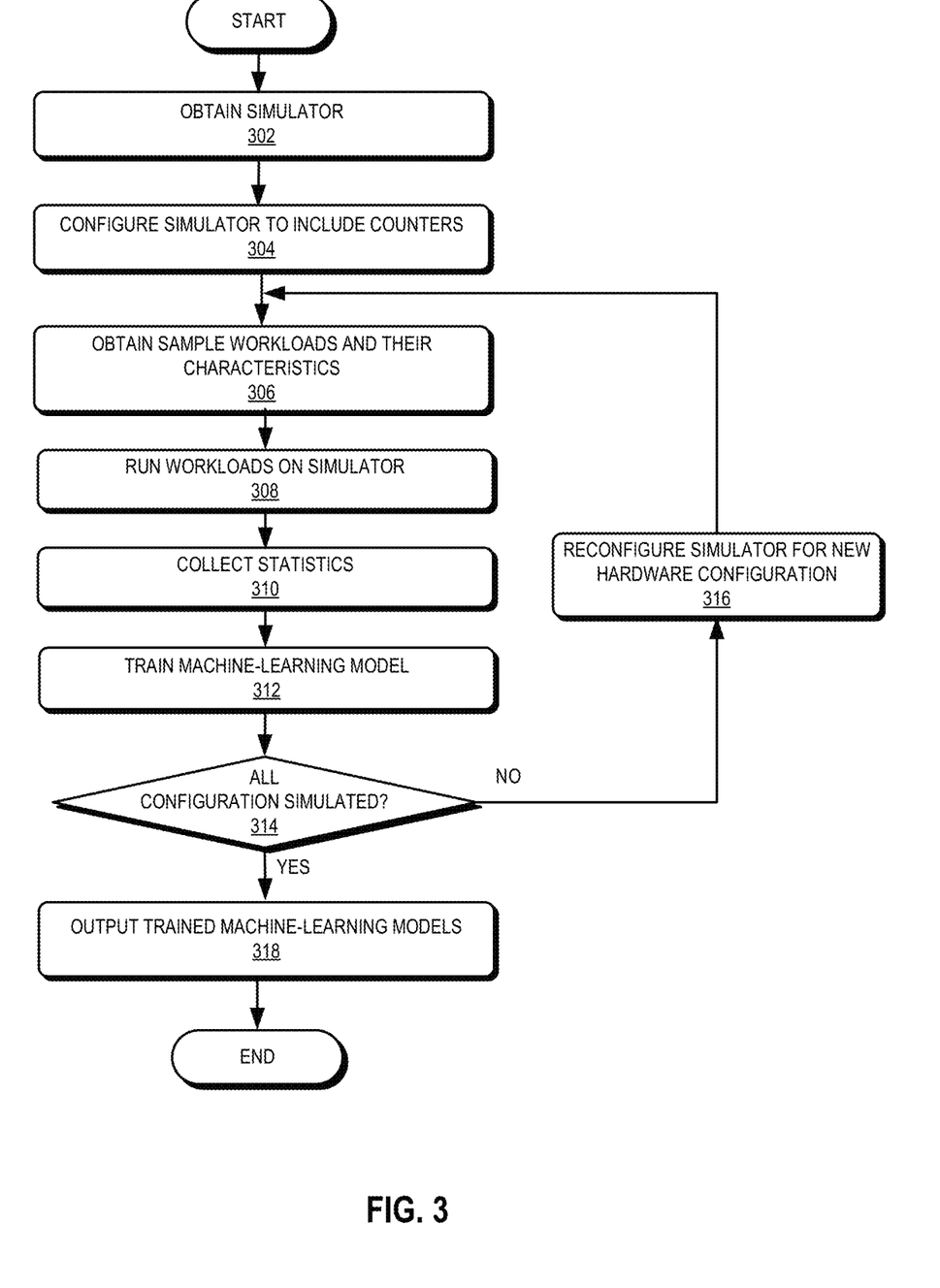
FIG. 3 presents a flowchart illustrating an exemplary process for training a machine-learning model, according to one embodiment.

FIG. 3 presents a flowchart illustrating an exemplary process for training a machine-learning model, according to one embodiment. During operation, a simulator that can simulate operations of a computer system with a plurality of interconnected nodes can be obtained (operation 302). The computer system can be a server cluster, a datacenter, an HPC system, an HPC datacenter, etc. The computer system being simulated may be an existing system or a system in the planning stage. In addition to processors and storage arrays, the computer system includes a plurality of network components. For example, a datacenter can include switches and routers as part of the datacenter network, and a server can include a SmartNIC for interfacing with the network. The simulator can be an existing simulator (e.g., SST or SST plus SuperSIM) or a custom-made simulator. The simulator can be configured in such a way that counters can be embedded in each simulated network component, such as an interface card or a switch (operation 304). The counters can be used to count the numbers and types of power-driven events (e.g., hardware tag-matching or route computation) occurring on each network component. If the simulator is an existing one, it can be extended/modified to include such counters. If the simulator is custom-made, it can be made to include such counters.

The system can obtain a number of sample workloads along with their characteristics (operation 306). In some embodiments, the sample workloads can be carefully selected to represent various types of workloads that the simulated computer system will run. For example, some customers are interested in a specific set of known microbenchmarks, benchmarks, and proxy applications. Accordingly, the sample workloads can include those benchmarks or proxy applications, such as a proxy application for parallel algebraic multigrid solver (AMG), a proxy application representing highly simplified communication patterns, a proxy application for particle codes, etc.). The characteristics of these proxy applications are often known in advance.

The system then runs the sample workloads on the simulator that is configured to simulate a particular hardware configuration of the computer system (operation 308) and collects statistics associated with the power-driven events occurring on network components (operation 310). Such statistics can include the values of the counters. Alternatively, the system can obtain power usage data of the simulated network components. In such a case, the simulator may additionally include a power-usage model for each network component. Statistics associated with the power-driven events (i.e., computations) occurring on the network components and the power usage data of the network components can all be part of network-power-related performance data, which indicates the network power performance of the workload. A certain workload can consume a large amount of network power (e.g., due to network components performing lots of computations), whereas a different workload may consume a small amount of network power.

When actual hardware of the computer system is available, the system can also run the sample workloads on the actual hardware and collect network-power-related measurements from the hardware (e.g., each network component). Network-power-related measurement results can include statistics of the network-power-related events (e.g., tag-matching or route-computing) occurring on each network component or computation-dependent power usage by each network component. In some embodiments, counters and sensors can be embedded in the hardware of each network component to perform the required measurement.

The system can train a machine-learning model using the characteristics of the sample workloads and the collected statistics associated with the network power events (operation 312). The trained machine-learning model can have the ability to predict statistics of the network-power-related events, given the characteristics of a new workload. For example, the trained machine-learning model can predict the values or ranges of the values of the counters based on the characteristics of the sample workloads. Alternatively, characteristics of the sample workloads and their simulated power usage data can be used as training samples to train the machine-learning model, and the resulting trained model can have the ability to predict a new workload's network power usage, given the characteristics of the new workload. Various machine-learning techniques, such as KCCA and deep neural networks, can be used to train the machine-learning model.

Many vendors (e.g., a vendor for a datacenter) offer a small set of fixed hardware configurations (e.g., a few choices for the number of the CPUs or the capability of the NICs/switches). Accordingly, the system can determine if all hardware configurations have been simulated (operation 314). If not, the system can vary the configuration of the simulator to simulate a different hardware configuration (operation 316) and run sample workloads on the reconfigured simulator to collect training data for the new hardware configuration (operation 306). Otherwise, the system can output the trained machine-learning models (operation 318). This way, a separate machine-learning model is trained for each hardware configuration.

Figure 4:
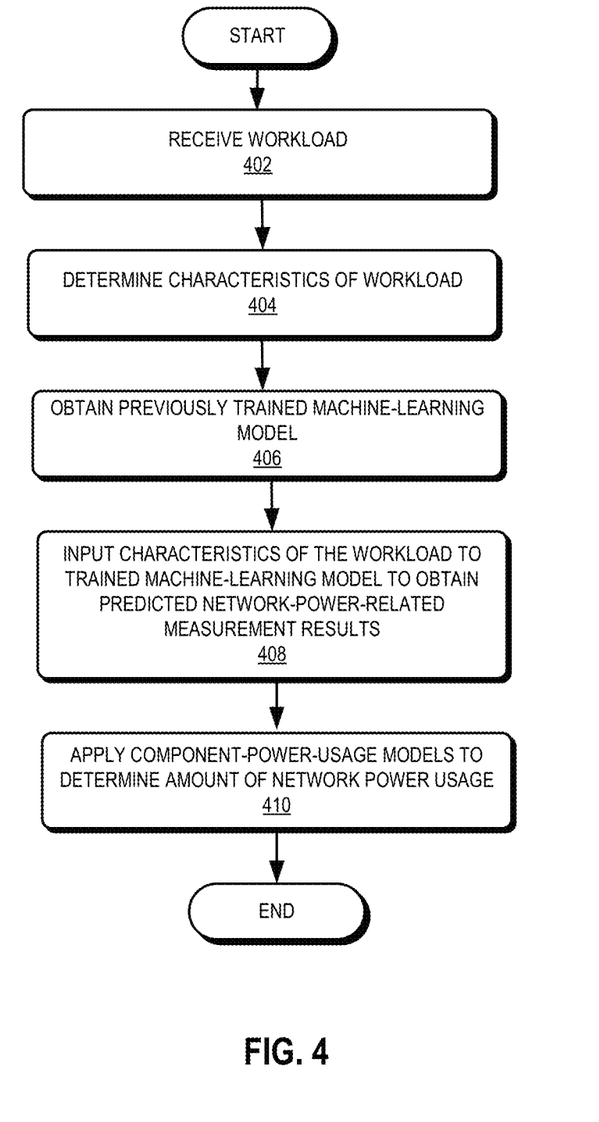
FIG. 4 presents a flowchart illustrating an exemplary process for predicting the network power usage of executing a workload on a computer system, according to one embodiment.

FIG. 4 presents a flowchart illustrating an exemplary process for predicting the network power usage of executing a workload on a computer system, according to one embodiment. During operation, the system receives a workload that requires evaluation on its network power usage behavior (operation 402) and determines the characteristics of the workload (operation 404). For parallel computing workloads, the system can analyze the communication patterns of the programs to determine their characteristics.

The system obtains a previously trained machine-learning model (operation 406). In some embodiments, this previously trained machine-learning model is specific to the hardware configuration (e.g., having a particular number of CPUs and having certain capabilities on the interfacing cards and/or switches) of the computer system that executes the workload. The system may be able to select, from a number of available models, a model based on the hardware configuration of the computer system. The machine-learning model is trained to predict network-power-related measurement results of a workload based on its characteristics. In some embodiments, the network-power-related measurement results can include statistics (e.g., type and count) associated with network-power-related events (e.g., power-consuming events such as tag-matching and route-computing) occurring on each network component. Alternatively, the network-power-related measurement results can also include the amount of network-related power usage of the workload (e.g., the amount of power consumed by each network component while performing computations). The amount of power used by the computer system as a whole can also be determined.

The system inputs the characteristics of the workload to the trained machine-learning model to obtain, based on outputs of the machine-learning model, the predicted network-power-related measurement results for the received workload (operation 408). The system can further apply a number of component-power-usage models to determine the total amount of network power usage of the workload (operation 410). More specifically, for each network component, the system can determine the amount of network power usage of the component while the workload is executed. Each type of network component can correspond to a component-power-usage model. The system sums the network power consumed by each network component to determine the total amount of network power required for executing the workload.

Figure 5:
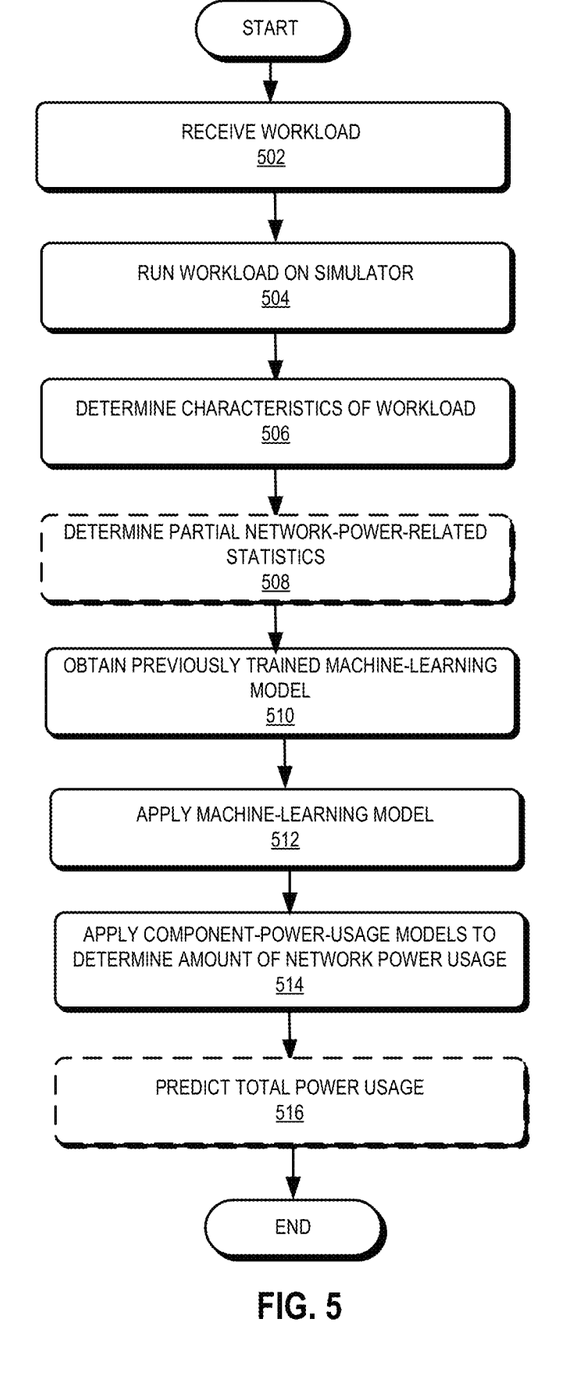
FIG. 5 presents a flowchart illustrating an exemplary process for predicting the power usage of executing a workload on a computer system, according to one embodiment.

In the example shown in FIG. 4, the characteristics of the workload are determined by analyzing the computer code of the workload. In alternative embodiments, such characteristics can be obtained by simulating the execution of the workload. FIG. 5 presents a flowchart illustrating an exemplary process for predicting the power usage of executing a workload on a computer system, according to one embodiment.

During operation, the system receives a workload that requires evaluation on its network power usage behavior (operation 502). More specifically, evaluating the network power usage behavior of a workload involves determining the network power usage pattern (e.g., amount and/or duration) associated with executing the workload on a predetermined computer system (e.g., an HPC system). The computer system can include a plurality of interconnected nodes, which can include a plurality of network components (e.g., switches and interface cards).

The system runs the received workload on a simulator that simulates operations of the predetermined computer system (operation 504). Note that the simulator is capable of simulating different computer systems. In this case, the simulator can be configured according to the computer system of interest. The simulator can be the same simulator that is used to train the machine-learning models and can include counters used for collecting network-power-related statistics. However, instead of running a full-length simulation, as in the case of collecting training samples, a partial simulation can be executed. In other words, the simulation can be run for a period that is much shorter than what is needed for running the full-length simulation. For example, the full-length simulation may require hundreds of hours, whereas the partial simulation refers to running the simulation for only a few hours. Alternatively, the simulation can also run at a reduced scale. For example, instead of hundreds of nodes, the simulation may run for a computer system having tens of nodes; or instead of running all code, only a portion of the workload' code is executed. Compare with the full-scale simulation, running the simulation at the reduced scale can be much faster. Based on the partial simulation, the system can determine the characteristics of the workload (operation 506). Characteristics of a workload can include the counts and types of operations executed, amount of data transferred, communications among the operations, and combinations of operations. The system can optionally determine partial network-power-related statistics based on the partial simulation (operation 508). Note that, compared with statistics obtained by running full-length or full-scale simulations, the partial network-power-related statistics are incomplete and less accurate.

The system obtains a previously trained machine-learning model that is specific to the predetermined computer system (operation 510). The system then applies the machine-learning model to determine the predicted network-power-related measurement results for the received workload (operation 512). In some embodiments, the system can input the characteristics of the workload (which can be determined from the simulation) and optionally the partial network-power-related statistics (which can also be determined from the simulation) to the trained machine-learning model, which can then predict network-power-related measurement results (e.g., statistics of network-power-related events occurring on each network component) for the received workload. In other words, by applying the machine-learning model, the complete network-power-related measurement results can be obtained, as if a full-length simulation has been run on the workload. The system can further apply a number of component-power-usage models to determine the total amount of network power usage of the workload (operation 514). Once the network power usage is predicted, the system can also optionally use this knowledge and other data collected during simulation to predict the total amount power consumed by the computer system, including power consumed by the servers and the storage devices (operation 516).

Figure 6:
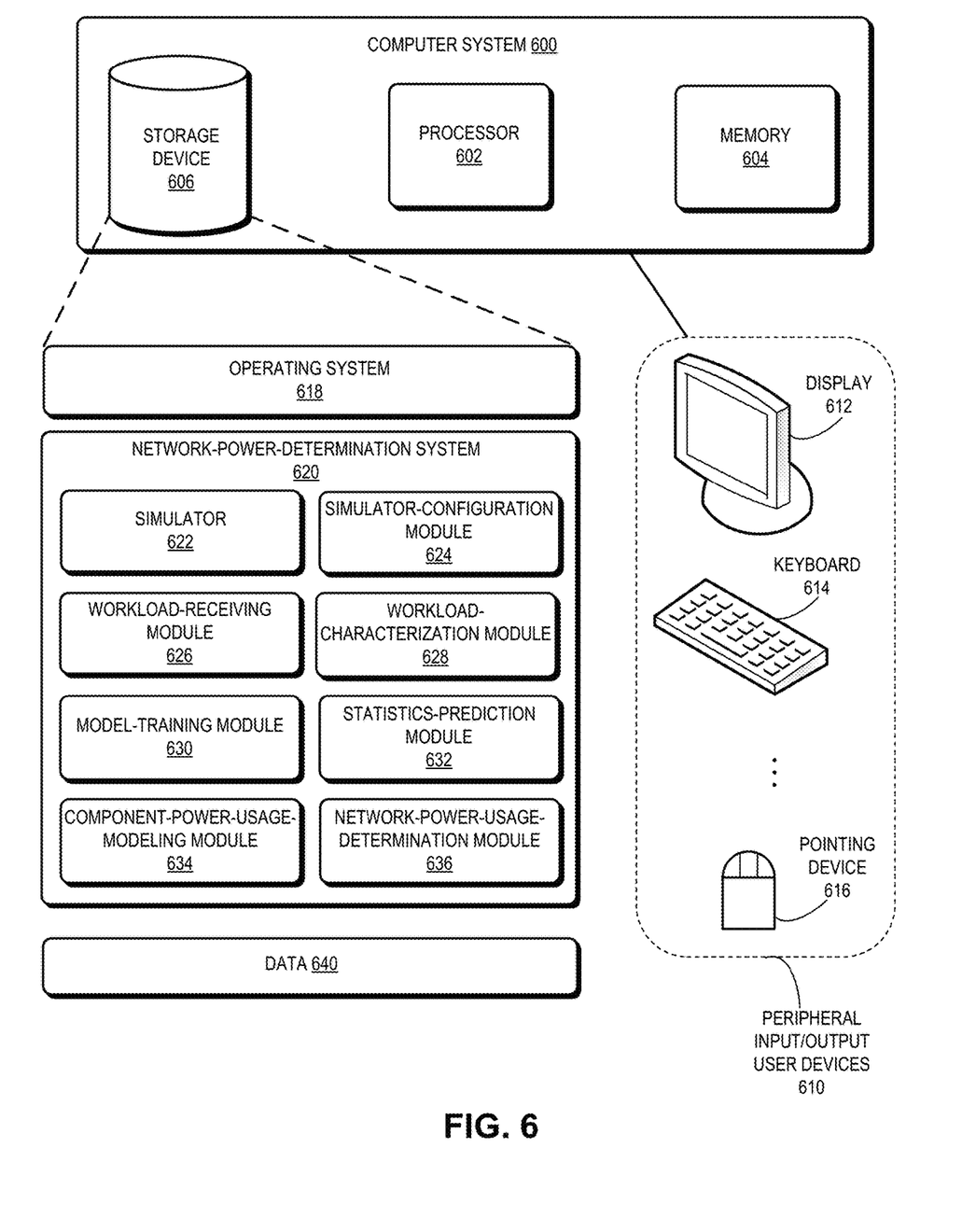
FIG. 6 illustrates an exemplary computer system that facilitates the determination of network power usage of executing workloads, according to one embodiment.

FIG. 6 illustrates an exemplary computer system that facilitates the determination of network power usage of executing workloads, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a network-power-determination system 620, and data 640. In addition to the hardware shown in the drawing, computer system 600 can also include hardware/firmware accelerators, such as graphics processing units (GPUs) and/or field-programmable gate arrays (FPGAs).

Network-power-determination system 620 can include instructions, which when executed by computer system 600, can cause computer system 600 or processor 602 to perform methods and/or processes described in this disclosure. Specifically, network-power-determination system 620 can include instructions for implementing a simulator that simulates operations of a computer cluster executing the workloads (simulator 622), instructions for configuring the simulator to include power-related-event counters (simulator-configuration module 624), instructions for receiving workloads, including the sample workloads and the workload to be evaluated (workload-receiving module 626), instructions for characterizing the workloads (workload-characterization module 628), and instructions for training a machine-learning model using historical data associated with sample workloads and their characteristics (model-training module 630), the historical data including statistics of network-power-related events collected by the counters while the workloads are running on the simulator. Network-power-determination system 620 can further include the instructions for predicting statistics of network-power-related events of the to-be-evaluated workload (statistics-prediction module 632), instructions for modeling the power usage of network components in the computer system (component-power-usage-modeling module 634), and instructions for determining the network power usage of the to-be-evaluated workload (network-power-usage-determination module 636).

The disclosed embodiments combine the simulation techniques with the machine-learning techniques in a unique way to provide the ability to predict a priori the power usage of network components in a large-scale computer cluster when running a workload. Compared with traditional approaches that rely only on simulations, the disclosed embodiments eliminate or reduce the need to run full-length simulations for all workloads. Once the machine-learning model is trained, it is no longer necessary to run simulation on the to-be-evaluated workload; the well-trained machine-learning model can directly predict statistics of the power-consuming events occurring on the network components. Such statistics can then be used to determine the network power usage of the computer cluster required for executing the to-be-evaluated workload. On the other hand, an approach that relies only on the machine-learning technique may have trouble in collecting sufficient amount of training samples, especially in situations where the hardware of the computer cluster is not yet available (e.g., in the designing stage of a datacenter). Using simulation techniques, which can be built on existing simulators (e.g., by extending the simulators to include event counters), the disclosed embodiments can collect a large number of training samples (including corner cases) without the limitation of hardware availability. Combining simulation with training and prediction can accelerate the process of discovering which features/measurements are most (and least) important to capture for the purpose of analyzing network power usage.

One embodiment provides a system and method for predicting network power usage associated with workloads. During operation, the system configures a simulator to simulate operations of a plurality of network components, which comprises embedding one or more event counters in each simulated network component. A respective event counter is configured to count a number of network-power-related events. The system collects, based on values of the event counters, network-power-related performance data associated with one or more sample workloads applied to the simulator; and trains a machine-learning model with the collected network-power-related performance data and characteristics of the sample workloads as training data 1, thereby facilitating prediction of network-power-related performance associated with a to-be-evaluated workload.

In a variation on this embodiment, the system determines characteristics of the to-be-evaluated workload and inputs the characteristics of the to-be-evaluated workload to the trained machine-learning model to obtain predicted network-power-related performance associated with the to-be-evaluated workload.

In a further variation, determining the characteristics of the to-be-evaluated workload comprises one or more of: analyzing communication patterns of the to-be-evaluated workload, and performing a partial simulation of executing the to-be-evaluated workload on the simulator.

In a variation on this embodiment, the network components comprise one of more of: a switch, a router, and a smart network interface controller (SmartNIC).

In a variation on this embodiment, the network-power-related events comprise computations performed by a network component, and the network-power-related performance data comprises: statistics of the computations performed by the network component, or power consumed by the network component for performing the computations.

In a variation on this embodiment, the system obtains network-power-related performance measurements associated with one or more sample workloads by running the one or more sample workloads on actual hardware and includes the network-power-related performance measurements as part of the training data.

In a variation on this embodiment, the sample workloads comprise one or more of: a high-performance computing workload, a data-processing workload, and a database workload.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-executed method, comprising:
configuring, by a computer, a simulator to simulate operations of a plurality of network components, wherein configuring the simulator comprises embedding one or more event counters in each simulated network component, and wherein a respective event counter is configured to count a number of network-power-related events;
collecting, based on values of the event counters, network-power-related performance data associated with one or more sample workloads applied to the simulator; and
training a machine-learning model with the collected network-power-related performance data and characteristics of the sample workloads as training data, thereby facilitating prediction of network-power-related performance associated with a to-be-evaluated workload.

2. The method of claim 1, further comprising:
determining characteristics of the to-be-evaluated workload; and
inputting the characteristics of the to-be-evaluated workload to the trained machine-learning model to obtain predicted network-power-related performance associated with the to-be-evaluated workload.

3. The method of claim 2, wherein determining the characteristics of the to-be-evaluated workload comprises one or more of:
analyzing communication patterns of the to-be-evaluated workload; and
performing a partial simulation of executing the to-be-evaluated workload on the simulator.

4. The method of claim 1, wherein the network components comprise one of more of:
a switch;
a router; and
a smart network interface controller (SmartNIC).

5. The method of claim 1, wherein the network-power-related events comprise computations performed by a network component, and wherein the network-power-related performance data comprises:
statistics of the computations performed by the network component; or
power consumed by the network component for performing the computations.

6. The method of claim 1, further comprising:
obtaining network-power-related performance measurements associated with one or more sample workloads by running the one or more sample workloads on actual hardware; and
including the network-power-related performance measurements as part of the training data.

7. The method of claim 1, wherein the sample workloads comprise one or more of:
a high-performance computing workload;
a data-processing workload; and
a database workload.

8. A computer system, comprising:
a processor;
a storage device coupled to the processor and storing instructions, which when executed by the processor cause the processor to perform a method, the method comprising:
configuring a simulator to simulate operations of a plurality of network components, wherein configuring the simulator comprises embedding one or more event counters in each simulated network component, and wherein a respective event counter is configured to count a number of network-power-related events;
collecting, based on values of the event counters, network-power-related performance data associated with one or more sample workloads applied to the simulator; and
training a machine-learning model with the collected network-power-related performance data and characteristics of the sample workloads as training data, thereby facilitating prediction of network-power-related performance associated with a to-be-evaluated workload.

9. The computer system of claim 8, wherein the method further comprises:
determining characteristics of the to-be-evaluated workload; and
inputting the characteristics of the to-be-evaluated workload to the trained machine-learning model to obtain predicted network-power-related performance associated with the to-be-evaluated workload.

10. The computer system of claim 9, wherein determining the characteristics of the to-be-evaluated workload comprises one or more of:
analyzing communication patterns of the to-be-evaluated workload; and
performing a partial simulation of the to-be-evaluated workload on the simulator.

11. The computer system of claim 8, wherein the network components comprise one of more of:
a switch;
a router; and
a smart network interface controller (SmartNIC).

12. The computer system of claim 8, wherein the network-power-related events comprise computations performed by a network component, and wherein the network-power-related performance data comprises:
statistics of the computations performed by the network component; or
power consumed by the network component for performing the computations.

13. The computer system of claim 8, wherein the method further comprises:
obtaining network-power-related performance measurements associated with one or more sample workloads by running the one or more sample workloads on actual hardware; and
including the network-power-related performance measurements as part of the training data.

14. A non-transitory computer-readable storage medium storing instructions that when executed by a computer cause the computer to perform a method, the method comprising, comprising:
configuring a simulator to simulate operations of a plurality of network components, wherein configuring the simulator comprises embedding one or more event counters in each simulated network component, and wherein a respective event counter is configured to count a number of network-power-related events;
collecting, based on values of the event counters, network-power-related performance data associated with one or more sample workloads applied to the simulator; and
training a machine-learning model with the collected network-power-related performance data and characteristics of the sample workloads as training data, thereby facilitating prediction of network-power-related performance associated with a to-be-evaluated workload.

15. The non-transitory computer-readable storage medium of claim 14, wherein the method further comprises:
determining characteristics of the to-be-evaluated workload; and
inputting the characteristics of the to-be-evaluated workload to the trained machine-learning model to obtain predicted network-power-related performance associated with the to-be-evaluated workload.

16. The non-transitory computer-readable storage medium of claim 15, wherein determining the characteristics of the to-be-evaluated workload comprises one or more of:
analyzing communication patterns of the to-be-evaluated workload; and
performing a partial simulation of executing the to-be-evaluated workload on the simulator.

17. The non-transitory computer-readable storage medium of claim 14, wherein the network components comprise one of more of:
a switch;
a router; and
a smart network interface controller (SmartNIC).

18. The non-transitory computer-readable storage medium of claim 14, wherein the network-power-related events comprise computations performed by a network component, and wherein the network-power-related performance data comprises:
statistics of the computations performed by the network component; or
power consumed by the network component for performing the computations.

19. The non-transitory computer-readable storage medium of claim 14, wherein the method further comprises:
obtaining network-power-related performance measurements associated with one or more sample workloads by running the one or more sample workloads on actual hardware; and
including the network-power-related performance measurements as part of the training data.

20. The non-transitory computer-readable storage medium of claim 14, wherein the sample workloads comprise one or more of:
a high-performance computing workload;
a data-processing workload; and
a database workload.

* * * * *